Patented Oct. 27, 1931

1,829,611

UNITED STATES PATENT OFFICE

EDWIN P. RYAN, OF SOMERSWORTH, NEW HAMPSHIRE

COMPOSITION

No Drawing.   Application filed January 27, 1930. Serial No. 423,905.

This invention has as its object to provide a novel composition of matter which may be dissolved in water for use in treating various kinds of cloth and which will serve as a medium for softening the cloth to which it is applied so that cloth, treated with the composition, may be more readily cut than when not so treated.

Another object of the invention is to provide a cloth treating composition which will remain in a fresh condition for an indefinite period of time, regardless of temperature and other conditions, and which will not become rancid or acid, and will likewise not shrink or dry so as to become hard, the invention also contemplating a composition for the purpose stated which will not be subject to deterioration.

The composition embodying the invention consists of the following ingredients in substantially the proportions stated:—

| Ingredient | Amount |
|---|---|
| Stearic acid (triple pressed) | 70 lbs. |
| Castor oil (soluble—50%) | 2 gal. |
| Wax (soluble) | 1 gal. |
| Ammonia | 1 gal. |
| Tapioca flour | 5 pints |
| Turpentine | 2 gal. |
| Water | 75 gal. |

Soluble castor oil is produced by treating castor oil with sulphuric acid, which renders it soluble so that it readily mixes with other ingredients. It is then neutralized with caustic soda to an absolutely neutral point.

The soluble wax is obtained from a paraffin base treated similar to the manner of treating the castor oil.

In preparing the composition, all of the ingredients with the exception of the ammonia are boiled for approximately two hours and preferably by a steam bath or other heating apparatus, and after the period of boiling, the ammonia is added and the mixture is agitated for a period of approximately one hour whereupon it may be drawn off in containers of considerable size and allowed to cool. I have found that this composition will keep indefinitely under all conditions, and will not sour, shrink, dry up, become hard or deteriorate.

The composition will also mix readily with other ingredients such for example, as starch mixtures, in which it will constitute a binder.

The composition may be mixed with starch or other solutions, in treating cloth and I have found that cloth treated by the use of the composition will possess a high degree of softness, and the composition will render the cloth pliable and smooth and impart thereto a glossy finish.

What I claim is:—

A cloth finishing composition for the purpose stated comprising an intimate mixture of the following ingredients:—Stearic acid, 70 lbs; soluble castor oil, 2 gal; soluble wax, 1 gal; ammonia, 1 gal; tapioca flour, 5 pints; turpentine, 2 gal; and water, 75 gal.

In testimony whereof I affix my signature.

EDWIN P. RYAN.